United States Patent [19]

Britt

[11] 4,157,768

[45] Jun. 12, 1979

[54] TRIPLE FUNCTION CLOSURE

[75] Inventor: William J. Britt, Greenville, S.C.

[73] Assignee: Morton-Norwich Products, Inc., Greenville, S.C.

[21] Appl. No.: 912,657

[22] Filed: Jun. 5, 1978

[51] Int. Cl.² ............................................. B67D 5/22
[52] U.S. Cl. .................................... 222/42; 222/205; 222/212; 222/486
[58] Field of Search ...................... 222/23, 41, 42, 47, 222/48, 129, 130, 157, 158, 205, 207, 211, 212, 424.5, 425, 443, 545, 446, 331, 330, 485, 486, 454

[56] References Cited

U.S. PATENT DOCUMENTS

| 788,118 | 4/1905 | Perotti | 222/454 |
|---|---|---|---|
| 869,702 | 10/1907 | Friend | 222/485 |
| 1,773,475 | 8/1930 | Casey | 22/454 |
| 3,141,574 | 7/1964 | Donoghue | 222/207 |
| 3,347,420 | 10/1967 | Donoghue | 222/207 |

Primary Examiner—Robert J. Spar
Assistant Examiner—H. Grant Skaggs

[57] ABSTRACT

A dispensing device for liquids wherein a toggle member defines separate channels so designed and arranged as to allow for the confinement, dispensing or measured dispensing of fluids held in a container to which the device is attached.

3 Claims, 4 Drawing Figures

TRIPLE FUNCTION CLOSURE

BACKGROUND OF THE INVENTION

The present invention relates to fluid dispensing devices incorporating a toggle member that accomplishes three distinct functions at three different positions: a leakproof closure; a squirt dispenser; and, a measured quantity dispenser.

Toggle valves have long been known in the art as a means for providing on-off closures, wherein the channel for dispensing a fluid from a reservoir defined by a bottle or other container, is composed of a segmented bore, part of which is defined by the toggle and part by the cap. When the bore segments are aligned by moving the toggle, the channel communicates between the reservoir of the bottle and the external environment allowing the fluid to escape when acted upon either by gravity or the pressure forces applied by constricting the sides of the container by a squeeze of the hand. Further movement of the toggle breaks the alignment of the bore segments, sealing the fluid in the reservoir, as the solid portion of the toggle mates with the top of the bore segment defined by the cap.

The present invention incorporates this feature and in addition, supplies a means whereby a precise amount of fluid may be decanted without aid of a separate measuring device; without danger of spilling the fluid, and wherein any excess fluid is returned to the container.

Earlier measuring/dispensing devices have been multipart, comparatively expensive, devices which relied primarily upon the time needed for a ball to sink through the fluid and seal the dispensing aperture; the time needed for the ball to sink being equal to the time needed for a specific amount of fluid to be dispensed.

SUMMARY OF THE INVENTION

The present invention provides the advantage of allowing either the squirting of a liquid directly from the container, or, the measuring of a desired amount, without requiring the user to employ a separate device. The height of the channels can be set by the manufacturer to predetermine the precise amount to be dispensed, be it a tablespoon of cough syrup, or two ounces of liquor, or a quarter cup of liquid laundry detergent, and thus insure uniform measurement and proper dosage.

BRIEF DESCRIPTION OF THE DRAWINGS

To facilitate a rapid understanding of the invention, reference will now be made to the preferred embodiment thereof illustrated in the accompanying drawings and specific language will be used to describe the same. It will nevertheless be appreciated that no limitation of the scope of the invention is thereby intended and that such further modification and alterations are contemplated as would normally occur to one skilled in the art to which the invention relates.

In the accompanying drawings.

DETAILED DESCRIPTION

Figure 1:
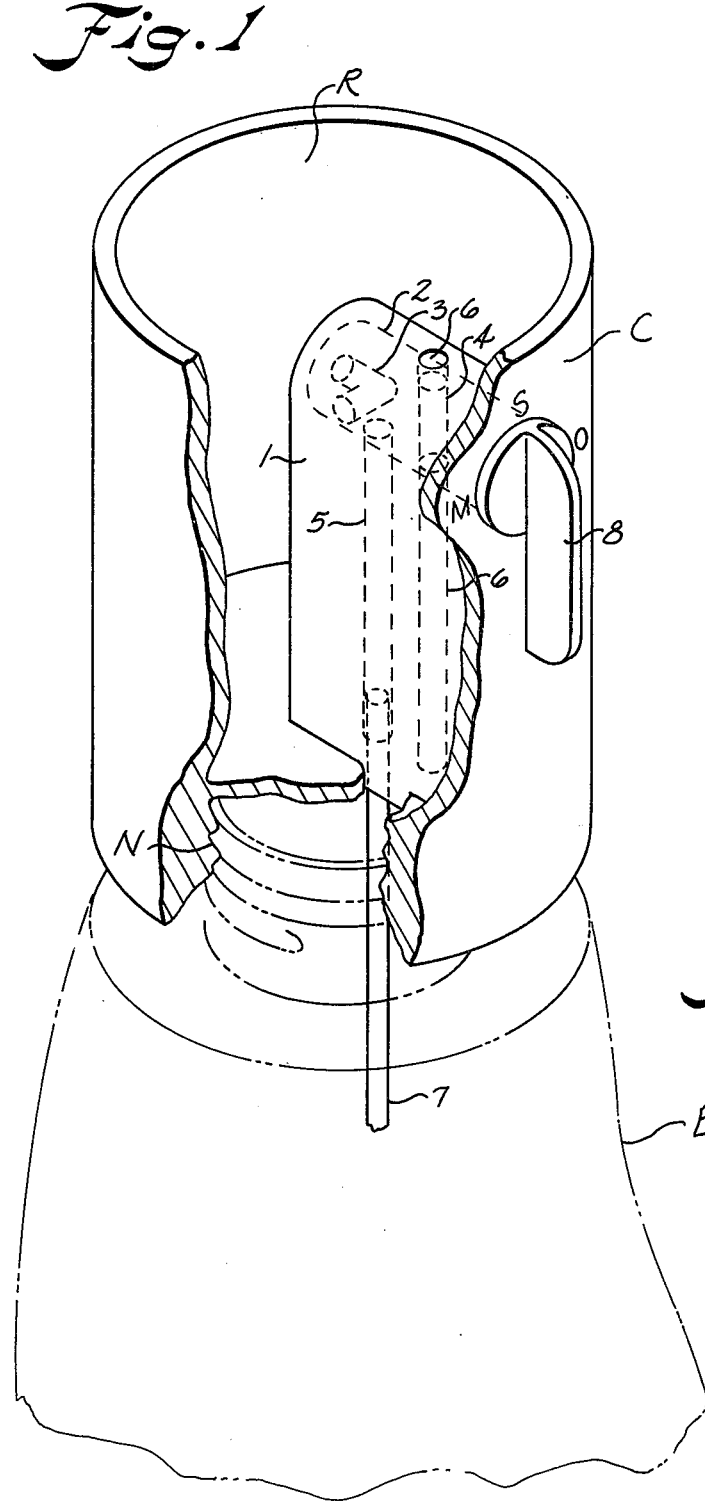
FIG. 1 is a view partly in section of the preferred triple function closure as applied to a conventional squeeze bottle container for the liquid to be dispensed or measured by the closure.

Referring now in detail to the drawing, the closure housing generally designated C, defining a measuring reservoir R, in its entirety is adapted for mounting on a resilient deformable container, formed from a material such as polyethylene, here illustrated in the form of a bottle B, adapted to hold a supply of the liquid product to be dispensed. The container has an externally threaded neck N, defining its filling and dispensing opening, which mates in fluid tight manner with the internally threaded neck of the closure housing C.

The closure comprises an external housing member 1 and an internal toggle member 2 respectively interconnected in fluid tight manner as by a snap fit.

The toggle member 2 is adapted for rotational movement within the external closure member 1 by means of a dial 8 mounted thereon by conventional means. The closure housing C may be marked as indicated in FIG. 1 to better inform the user of the function in use.

The toggle member has formed therein an L-shaped bore 3 having internal and external openings and a straight bore 4, both extending through said toggle member.

A measuring channel 5 is formed in the external housing member, in alignment with the internal opening of the L-shaped bore 3, and a conventional dip tube 7 is fitted into the lower end of said measuring channel 5 and communicates with the lower end portion of the container B.

By rotating the toggle, the straight bore 4 will come into simultaneous register with both parts of the squirt channel 6, which extends through the external closure member 1 adjacent to the measuring channel.

The arrangement of the bores 3 and 4 within the toggle member 1 and the corresponding arrangements of the channels 5 and 6 within the external closure member enables the user to select either the measure, squirt, or off function.

The squirt channel 6, composed of segments above and below the toggle 2, is formed in the external closure member 1 and aligned with both ends of the straight bore 4.

Figure 2:
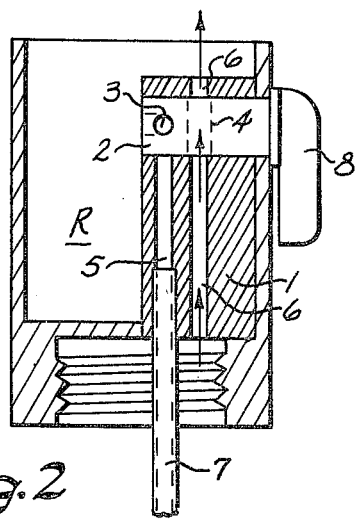
FIG. 2 is a section through the closure, taken in a vertical plane midway through the closure, and with the toggle in the position which it assumes when the closure is in the squirt setting.

The operation of this closure is summarized as follows:

Assume that the closure members are in the positions illustrated in FIG. 2, which is taken in a vertical plane through the closure. At this time, the measuring channel 5 is sealed by the solid portion of the toggle member 2 and the straight bore 4 is in alignment with both segments of the squirt channel 6. The container may be grasped in the user's hand with the fingers thereof encircling the sides of the deformable container B and tilted in the direction desired. By squeezing the container, the resultant pressure on the liquid causes it to rise through the squirt channel and straight bore which are opened to the atmosphere allowing the pressurized liquid to escape. At the same time, the liquid rising in the dip tube 7 and measuring channel 5 is prevented from escaping by the seal provided by the toggle member 2. Release of the sides of the container will cause the pressure of the fluid to drop and the squirt dispensing to stop.

Figure 3:
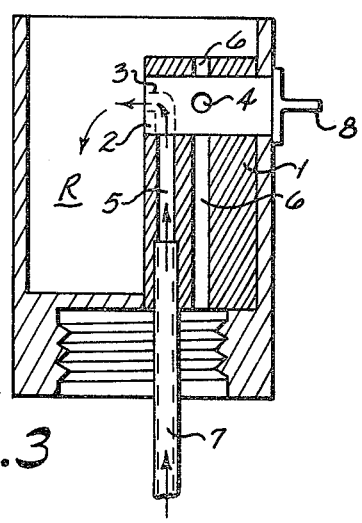
FIG. 3 is a view similar to FIG. 2, with the toggle in the position which it assumes when the closure is in the measure setting.

Rotation of the dial 8 ninety degrees to the left from the position shown in FIG. 2 will place the closure members in the positions shown in FIG. 3. At this time, the squirt channel 6 is sealed by the solid portion of the toggle member 2 and the L-shaped bore 3 is aligned with the measuring channel 5 and the dip tube 7. When the deformable container is grasped and squeezed in the hand of the user, the resultant pressure on the liquid causes it to rise through the dip tube 7, the measuring channel 5 and the L-shaped bore 3, which are now open to the atmosphere allowing the pressurized liquid to flow out into the reservoir R. The height and width of the reservoir and the height of the L-shaped bore in relation thereto being predetermined to allow for the dispensing of the desired amount of liquid. If more liquid is squeezed out than was intended to be dispensed, the user need only relax his squeeze upon the container B and the suction created by the expansion of the deformable container will draw the excess fluid from the reservoir R back through the L-shaped bore 3, measuring channel 5 and dip tube 7 into the container B thereby assuring dispensing of the desired amount only. No fluid would normally enter the squirt channel 6 during this operation since it is not connected to the fluid in the container by a dip tube. In the event, however, that the container is tipped or overfull during this operation, the fluid will be prevented from escaping through the squirt channel 6 by the seal formed by the solid portion of the toggle member 2.

Figure 4:
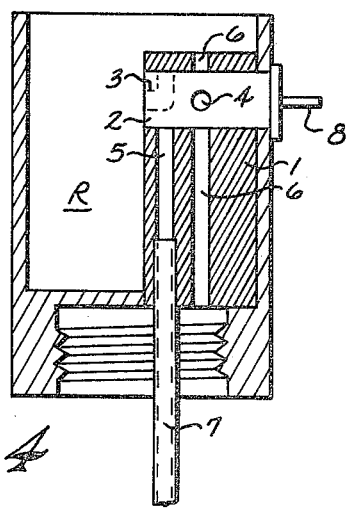
FIG. 4 is a view similar to FIGS. 2 and 3, with the toggle in the position which it assumes when the closure is in the off setting.

Rotation of the dial 8 one hundred and eighty degrees to the right from the position shown in FIG. 3 will place the closure members as shown in FIG. 4. At this time, the measuring channel 5 and the squirt channel are both sealed by the solid portion of the toggle member 2 and no fluid may escape from the container.

Having thus described my invention, I claim:

1. A liquid dispensing closure for application to a resilient deformable container, which comprises:
   a closure housing having a measuring reservoir formed therein for containing and measuring the liquid to be dispensed;
   an external housing member, carried by said closure housing, having a squirt channel extending through its length and a measure channel adjacent to said squirt channel extending from the base of the external housing member to a point where it is intersected by a toggle member;
   a toggle member, rotatably clamped within said external housing member in normaly fluid tight manner in a position to intersect said measure and squirt channels, having a straight bore extending there through so positioned that as the toggle member is rotated said straight bore will register with said squirt channel, and having an L-shaped bore forming a right angle and extending through said internal toggle member, and so positioned that as the toggle member is rotated said L-shaped bore will register with said squirt channel at a position distinct from that of the straight bore and squirt channel;
   said measure channel being adapted at its base to receive and hold a dip tube for communication with the lower end portion of the container.

2. A liquid dispensing closure as recited in claim 1, wherein said external housing member is formed as an integral component part of said closure housing.

3. A liquid dispensing closure as recited in claim 1, wherein said internal toggle member is formed with a dial for ease of selection setting.

* * * * *